(12) United States Patent
Wang

(10) Patent No.: US 6,715,391 B2
(45) Date of Patent: Apr. 6, 2004

(54) DEVICE FOR SECURING VARIOUS TABLE SAWS TO WORK TABLE

(76) Inventor: Tian Wang Wang, P.O. Box 63-99, Taichung (TW), 406

( * ) Notice: Subject to any disclaimer, the term of this patent is extended or adjusted under 35 U.S.C. 154(b) by 11 days.

(21) Appl. No.: 10/095,094

(22) Filed: Mar. 12, 2002

(65) Prior Publication Data

US 2003/0172788 A1 Sep. 18, 2003

(51) Int. Cl.[7] .............................................. B23D 19/00
(52) U.S. Cl. ..................... 83/471.3; 83/574; 248/670; 248/678; 248/680; 144/286.1
(58) Field of Search ............... 83/471.3, 471.2, 83/574; 144/2.1, 286.1; 248/670, 678, 680

(56) References Cited

U.S. PATENT DOCUMENTS

| | | | | |
|---|---|---|---|---|
| 1,756,121 A | * | 4/1930 | Hedgpeth | 83/574 |
| 2,512,419 A | * | 6/1950 | Dergance | 83/477.1 |
| 2,630,147 A | * | 3/1953 | Garberg | 83/574 |
| 2,722,952 A | * | 11/1955 | Snyder | 83/471.2 |
| 2,987,083 A | * | 6/1961 | Ross et al. | 83/574 |
| 3,945,286 A | * | 3/1976 | Smith | 83/486.1 |
| 3,991,643 A | * | 11/1976 | Girardin | 83/564 |
| 4,292,870 A | * | 10/1981 | Mericle | 83/471.2 |
| 4,328,728 A | * | 5/1982 | Ferdinand et al. | 83/471.3 |
| 4,494,431 A | * | 1/1985 | Niswonger | 83/471.3 |
| D299,241 S | | 1/1989 | Hoshino et al. | |
| 4,958,544 A | | 9/1990 | Miyamoto | |
| 5,243,890 A | * | 9/1993 | Ober | 83/471.2 |
| 5,664,612 A | * | 9/1997 | Klemma | 144/286.1 |
| D418,525 S | | 1/2000 | Watson et al. | |
| 6,488,256 B1 | * | 12/2002 | Chang | 248/670 |

\* cited by examiner

*Primary Examiner*—Allan N. Shoap
*Assistant Examiner*—Isaac Hamilton

(57) ABSTRACT

A table saw securing device includes a post extended from a work table, a cantilever beam attached to the post, a housing rotatably and slidably attached to the cantilever beam, and a saw device selectively secured to the housing. One or more seats are secured on a bottom board of the housing and each includes a channel for adjustably securing a bolt. One or more bars each has one end secured to the bolts, and one or more fasteners threaded to the other end and engaged with the saw device, for detachably securing various kinds of saw device to the bottom board of the housing.

5 Claims, 7 Drawing Sheets

FIG. 1

DEVICE FOR SECURING VARIOUS TABLE SAWS TO WORK TABLE

BACKGROUND OF THE INVENTION

1. Field of the Invention

The present invention relates to a table saw securing device and more particularly to a table saw securing device for securing various kinds of table saws onto the work table.

2. Description of the Prior Art

Typical table saws comprise a table saw member to be secured on a work table. However, the typical work tables normally include a predetermined shape or configuration for receiving and securing a selected type of table saw members, such that the other table saw members may not be easily and changeably secured onto the work tables.

For example, U.S. Pat. No. Des. 299,241 to Hoshino et al., and U.S. Pat. No. Des. 418,525 to Watson et al., and U.S. Pat. No. 4,958,544 to Miyamoto disclose three of the typical arm saws which include a saw device slidably secured on top of a work table with a cantilever beam, for allowing the saw device to be moved or adjusted along the cantilever beam, in order to work onto or cut the work pieces. However, the saw devices may not be easily disengaged from the cantilever beam, and the other saw devices may not be attached onto the cantilever beam for conducting different operations, for example. In addition, the saw devices are slidably secured onto the cantilever beam and may not be rotated or adjusted relative to the cantilever beam.

The present invention has arisen to mitigate and/or obviate the afore-described disadvantages of the conventional table saw securing devices.

SUMMARY OF THE INVENTION

The primary objective of the present invention is to provide a table saw securing device for securing or attaching various kinds of table saws onto the work table.

In accordance with one aspect of the invention, there is provided a table saw securing device comprising a work table including a post extended therefrom, and a cantilever beam attached to the post, a housing slidably attached to the cantilever beam, a saw device, and means for securing the saw device to the housing.

The housing includes a bottom board, the securing means is provided for securing the saw device to the bottom board of the housing.

The bottom board includes an opening formed therein, the saw device includes a saw member extended through the opening of the bottom board.

The securing means includes at least one seat secured on the bottom board, and having a channel formed therein, a bar having a first end slidably secured to the channel of the seat and having a second end, and a fastener threaded to the second end of the bar and engaged with the saw device, for securing the saw device to the bottom board of the housing.

The saw device includes a bottom plate, the fastener is engaged with the bottom plate of the saw device.

The channel of the seat includes an inverted T-shaped structure, the securing means includes a bolt having a head slidably received in the channel of the seat.

The housing includes an upper panel, and at least one rod secured between the upper panel and the bottom board, the seat includes at least one oblong hole formed therein for slidably and adjustably receiving the rod of the housing.

A bracket is further provided and slidably secured to the cantilever beam, and means for rotatably fastening the housing to the bracket.

The housing includes an upper panel, the rotatably fastening means includes an axle rotatably secured in the upper panel of the housing and secured to the bracket.

The upper panel of the housing includes a hub provided therein for rotatably receiving the axle.

The axle includes a peripheral flange extended radially outward therefrom and engaged with the hub of the housing for rotatably securing the axle to the hub of the housing.

A spring biased projection is further provided and engaged in the hub and engaged with the axle for positioning the axle to the hub at any selected angular position.

The cantilever beam includes a track rail provided therein, the bracket includes a plurality of rollers engaged with the track rail for slidably securing the bracket to the cantilever beam.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a table saw securing device in accordance with the present invention;

DETAILED DESCRIPTION OF THE PREFERRED EMBODIMENT

Figure 1:
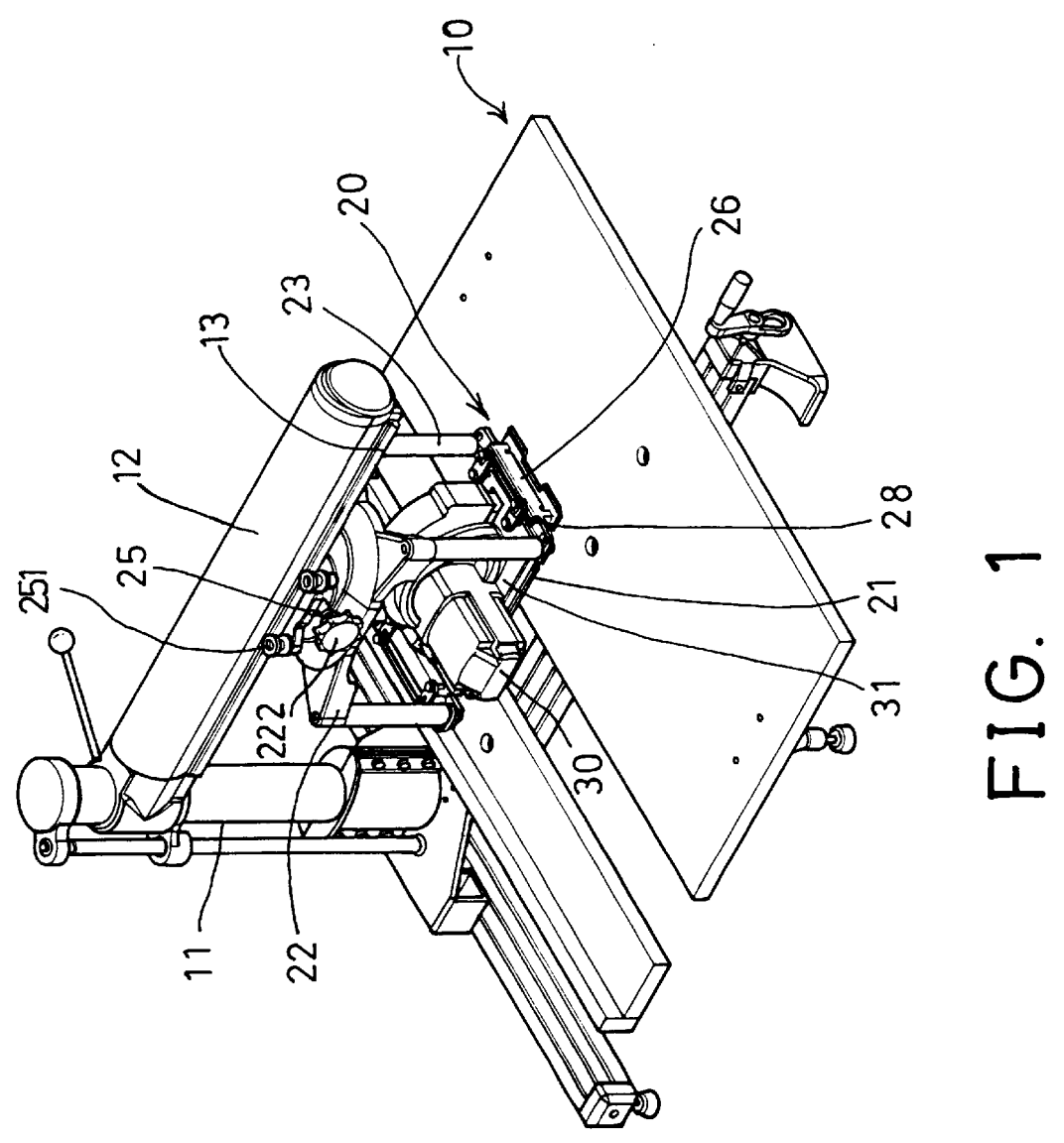
Figure 2:
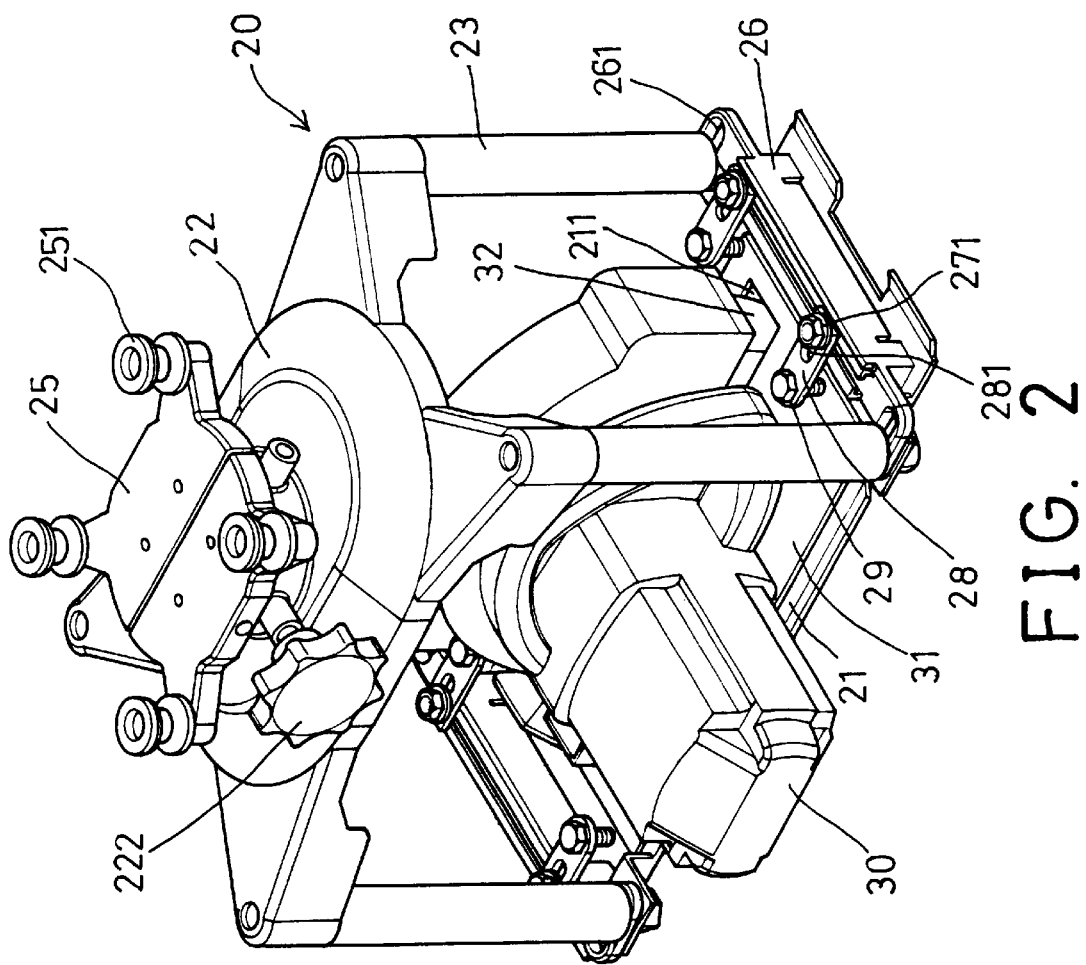
FIG. 2 is an enlarged partial perspective view of the table saw securing device.
Figure 3:
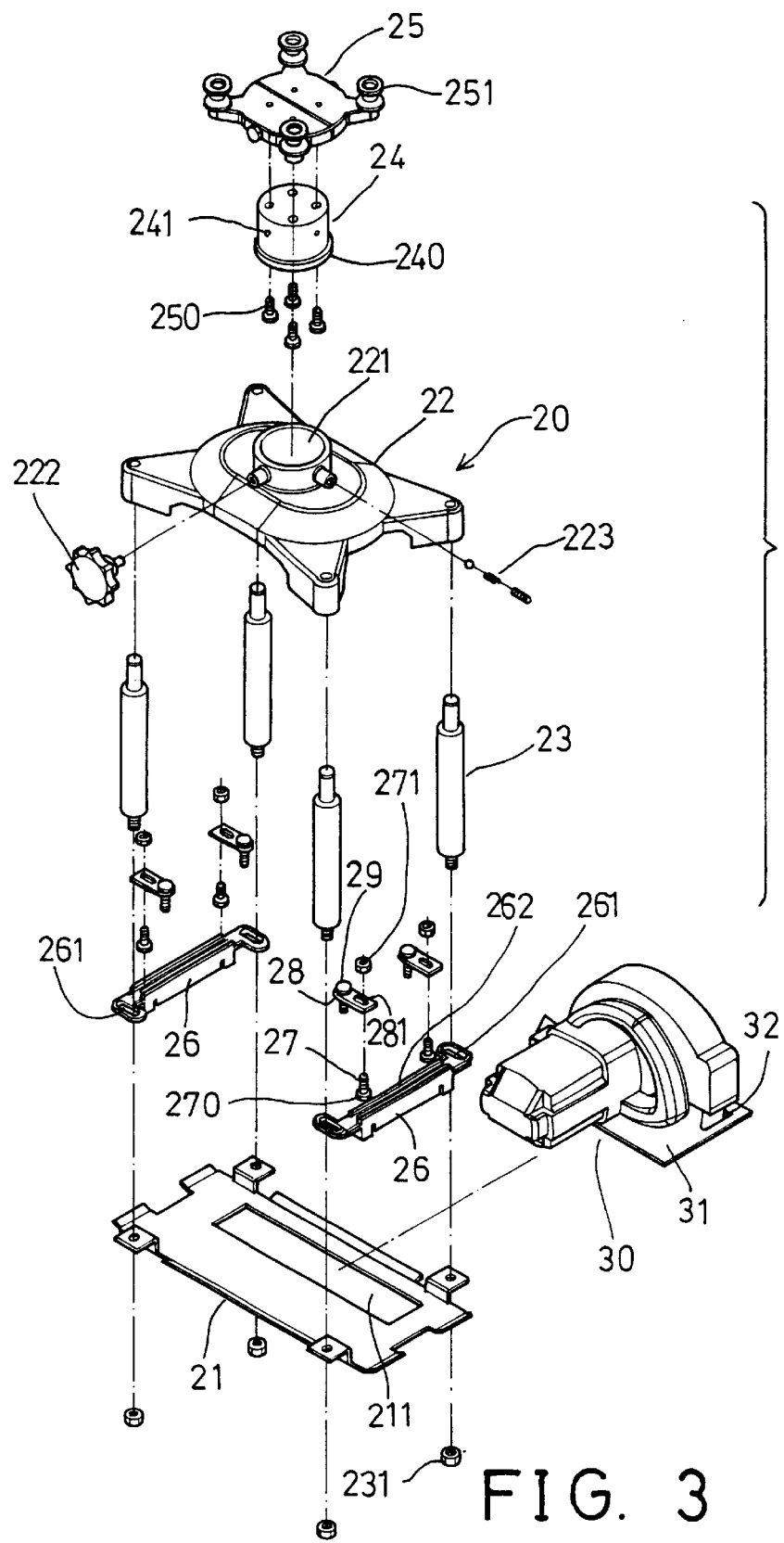
FIG. 3 is a partial exploded view of the table saw securing device.
Figure 4:
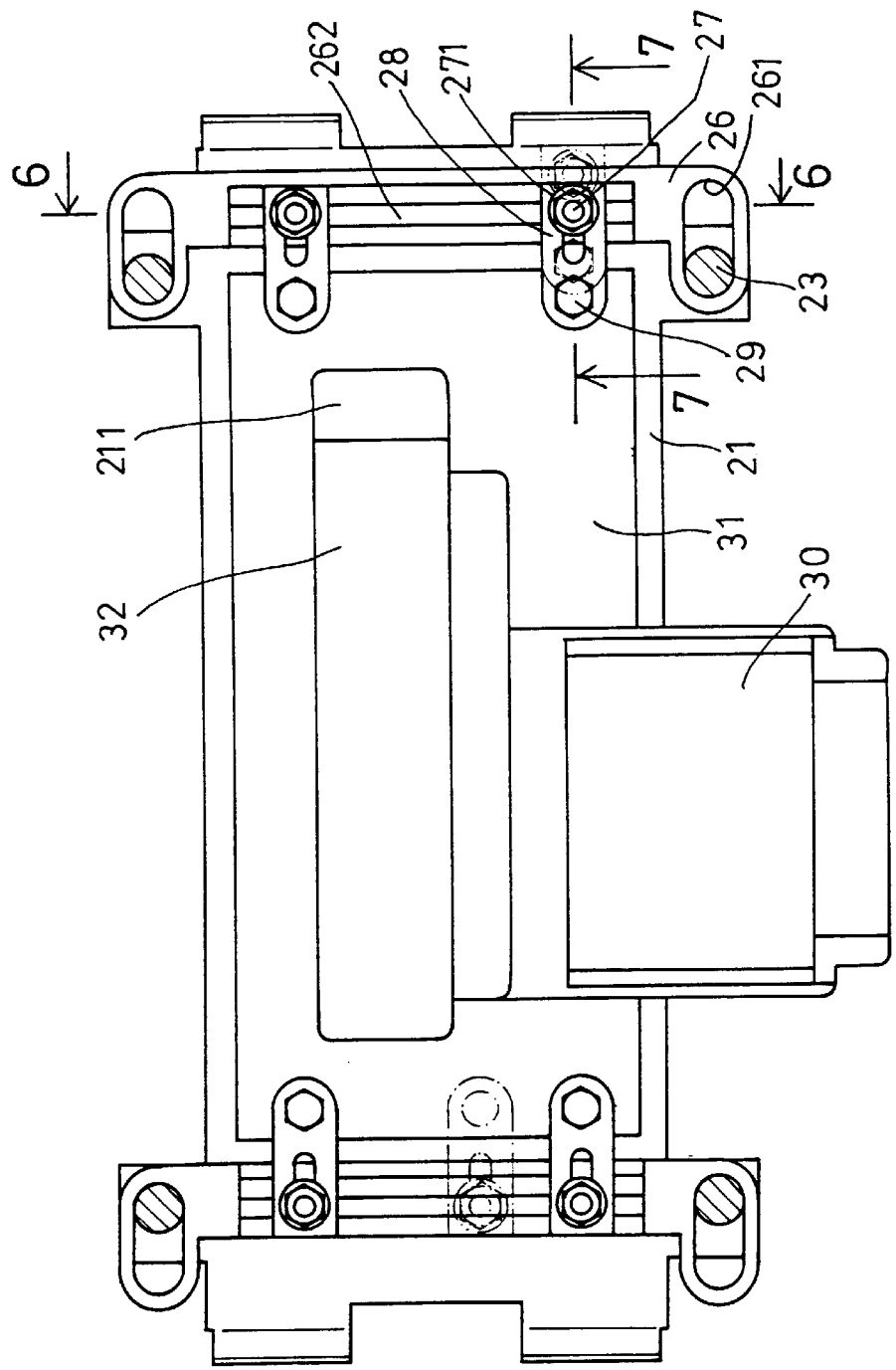
FIG. 4 is a top plan schematic view of the table saw securing device.
Figure 5:
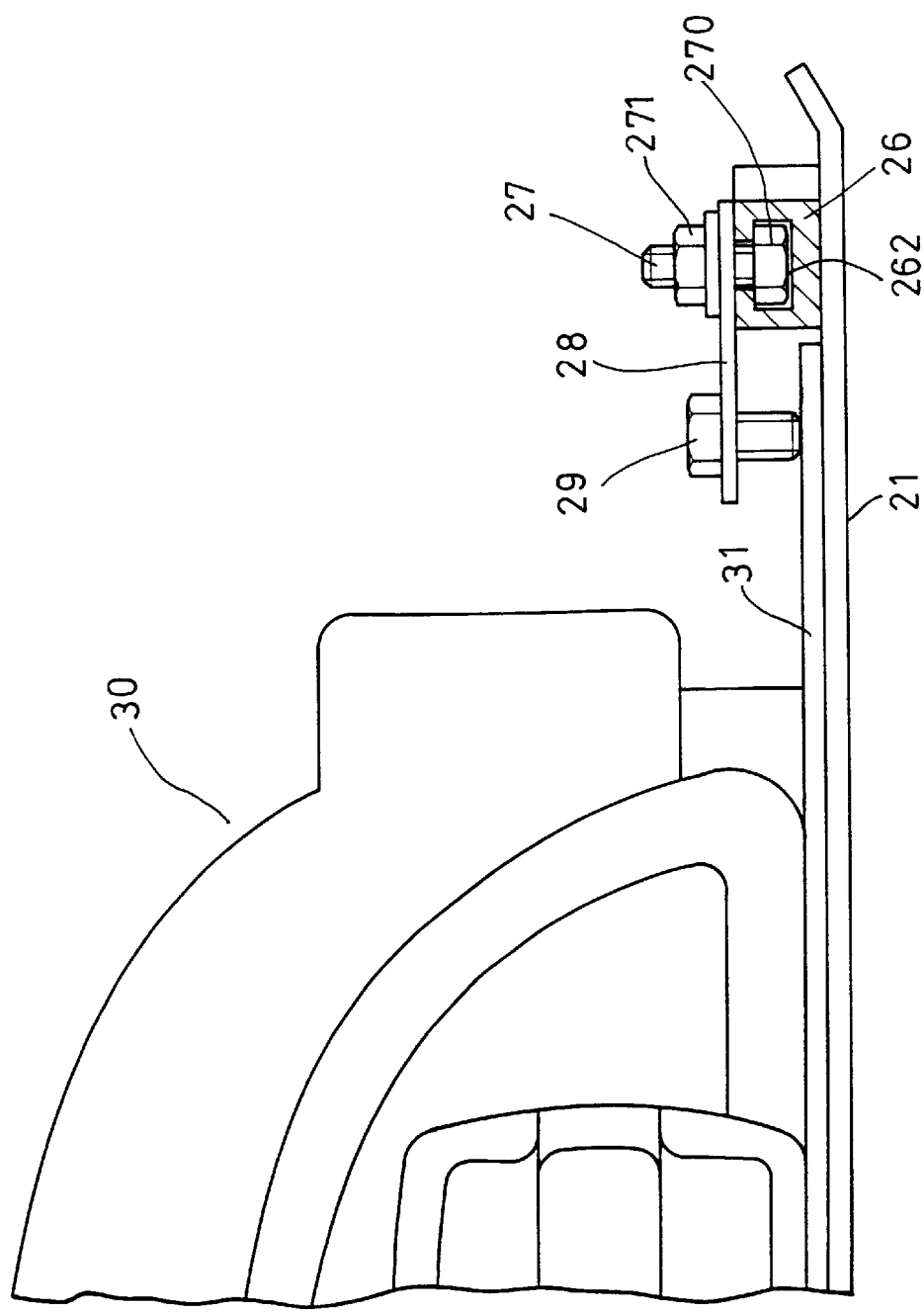
FIG. 5 is a partial side schematic view of the table saw securing device.

Referring to the drawings, and initially to FIGS. 1–5, a table saw securing device in accordance with the present invention comprises a typical post 11 secured or extended upward from a work table 10, and a typical cantilever beam 12 rotatably and/or slidably secured onto the post 11, for allowing the cantilever beam 12 to be rotated and moved up and down relative to the post 11. The cantilever beam 12 includes a track rail 13 provided on the lower or bottom portion thereof. The cantilever beam 12 may be attached onto the post 11 with typical fasteners or locks. The securing or the attachment of the cantilever beam 12 onto the post 11 is typical and will not be described in further details.

A housing 20 includes a bottom board 21 and upper panel 22, and three or more rods 23 secured between the bottom board 21 and the upper panel 22 with such as the fasteners 231, for forming a chamber or a space within the housing 20 and for receiving various kinds of typical saw devices 30. The typical saw devices 30 each includes a bottom plate 31 secured and provided thereon, and each includes a saw blade or a saw member 32 provided therein and extended downward through or beyond the bottom plate 31 for conducting saw or cutting operations. The bottom board 21 includes an opening 211 formed therein for receiving the saw member 32 and for allowing the saw member 32 to be extended downward through the opening 211 of the bottom board 21 and beyond the bottom board 21 to conduct the sawing or cutting operations. Image Page 1

The upper panel 22 includes a hub 221 provided therein. An axle 24 is rotatably secured in the hub 221 and includes a peripheral flange 240 extended radially outward therefrom for engaging with the upper panel 22 and for rotatably securing the axle 24 to the hub 221 of the upper panel 22. A fastener 222 is rotatably secured to the hub 221 and selectively threaded with either of the holes or cavities 241 of the axle 24 for securing the axle 24 to the hub 221 of the panel 22 at the selected angular position. A bracket 25 is secured on top of the axle 24 with fasteners 250, and includes two or more wheels or rollers 251 provided on top thereof and engaged with the track rail 13 of the cantilever beam 12, for slidably securing the housing 20 and the saw device 30 to the cantilever beam 12.

It is to be noted that the saw device 30 is secured on the bottom board 21 of the housing 20, and the housing 20 is rotatably and adjustably secured to the bracket 25 with the axle 24 and the fastener 222. In addition, the bracket 25 is slidably secured onto the track rail 13 of the cantilever beam 12, such that the housing 20 and thus the saw device 30 may be rotatably and slidably secured to the cantilever beam 12 with the axle 24 and the rollers 251 of the bracket 25. A spring biased projection 223 may further be provided and engaged into the hub 221 and engageable with the cavities 241 of the axle 24, for further positioning the axle 24 to the hub 221 of the panel 22, and for further securing the axle 24 to the panel 22 at the selected angular positions.

Figure 6:
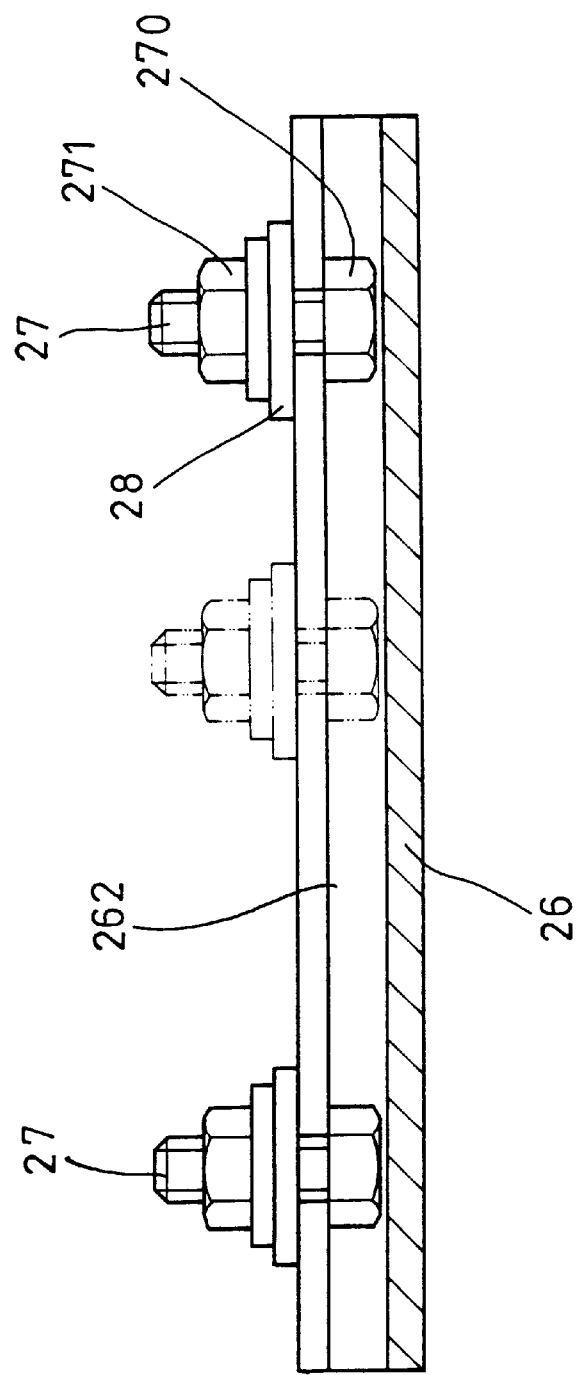
FIG. 6 is a partial cross sectional view taken along lines 6—6 of FIG. 4.
Figure 7:
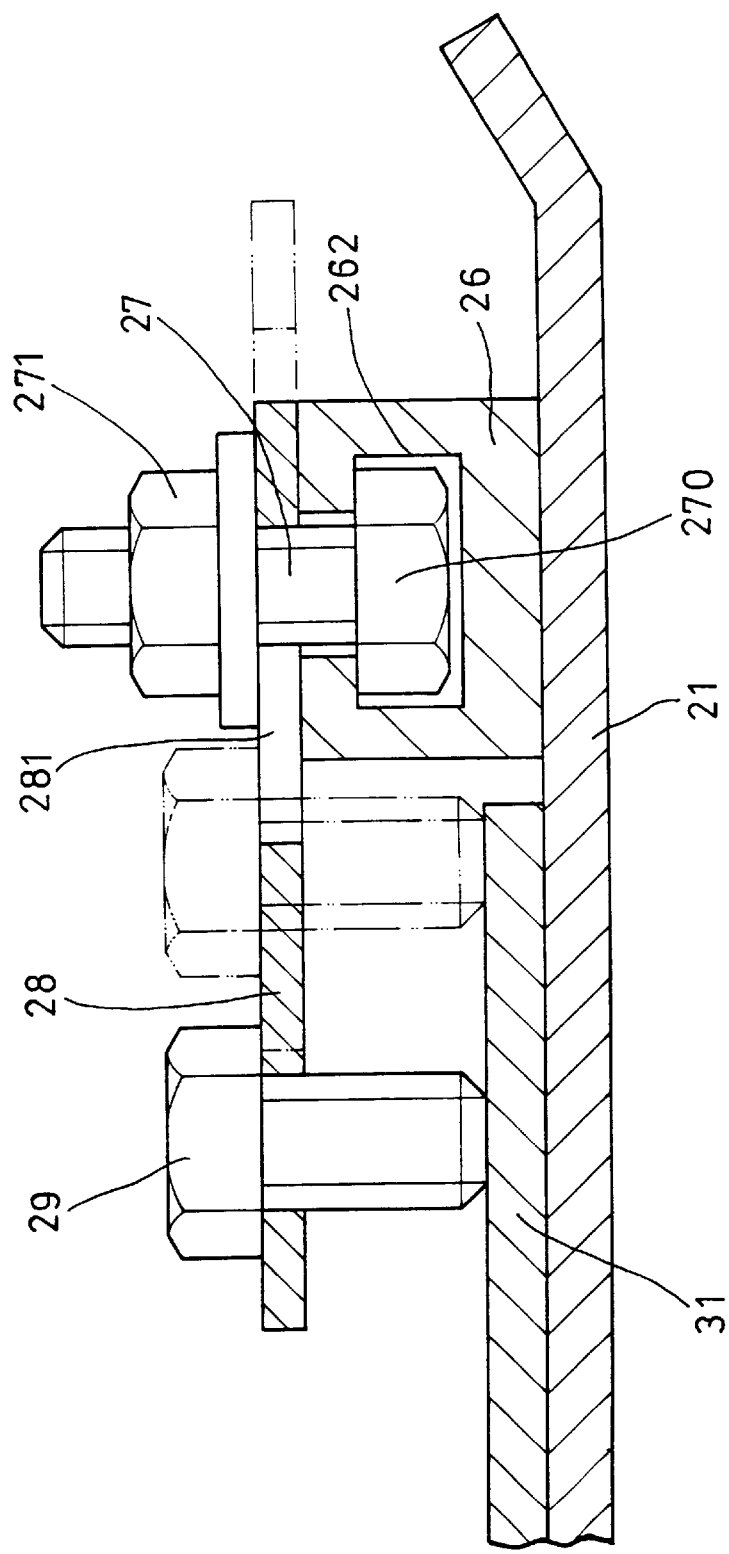
FIG. 7 is a partial cross sectional view taken along lines 7—7 of FIG. 4.

Referring next to FIGS. 6 and 7, and again to FIGS. 2–5, two seats 26 are secured on the bottom board 21 with such as the fasteners 231, and each includes two ends each having an oblong hole 261 formed therein for slidably or adjustably receiving the rods 23 (FIG. 4) and for allowing the seats 26 to be moved or adjusted toward each other or away from each other before the rods 23 are secured to the bottom board 21 with the fasteners 231. The seats 26 each includes an inverted T-shaped channel 262 formed therein. One or more bolts or fasteners 27 each includes a head 270 slidably received in the channels 262 of the seats 26.

One or more bars 28 each includes an oblong hole 281 formed in one end thereof for slidably and adjustably receiving the bolts 27, and for securing to the bolts 27 with lock nuts 271, and each includes one or more fasteners 29 threaded thereto, such as threaded to the other end thereof; and engageable with the bottom plate 31 of the saw device 30 (FIGS. 4, 5, 7), for securing the bottom plate 31 of the saw device 30 to the bottom board 21 of the housing 20.

It is to be noted that the seats 26 may be adjusted toward and away from each other by the sliding engagement of the rods 23 in the oblong holes 261 of the seats 26 respectively. In addition, the bars 28 may be moved or adjusted relative to the seats 26 respectively by the sliding engagement of the bolts 27 in the oblong holes 281 of the bars 28 respectively, such that the fasteners 29 may be adjusted relative to the bottom board 21 for securing various kinds of bottom plates 31 of various saw devices 30 onto the bottom board 21 of the housing 20.

Accordingly, the table saw securing device in accordance with the present invention may be used for adjustably securing various kinds of table saws onto the work table.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A table saw securing device comprising:

a work table including a post extended therefrom, and a beam attached to said post, said beam including a track rail provided therein, a housing including an upper panel, a bottom board having an opening formed therein, and at least one rod secured between said upper panel and said bottom board, a bracket rotatably secured to said upper panel of said housing with an axle, and including a plurality of rollers engaged with said track rail of said beam, to slidably secure said bracket and said housing to said beam, a saw device disposed on said bottom board of said housing, at least one seat secured on said bottom board of said housing, said at least one seat including an oblong hole formed therein to slidably and adjustably receive said at least one rod of said housing, and to adjustably secure said at least one rod of said housing to said at least one seat, a bar including a first end slidably secured to said at least one seat, and including a second end, and a fastener threaded to said second end of said bar and engaged with said saw device, to adjustably secure said saw device to said bottom board of said housing.

2. The table saw securing device according to claim 1, wherein said at least one seat includes a channel formed therein and having an inverted T-Shaped structure, a bolt having a head slidably received in said channel of said at least one seat, said bolt is attached to said first end of said bar to slidably secure said bar to said at least one seat.

3. The table saw securing device according to claim 1, wherein said upper panel of said housing includes a hub provided therein for rotatably receiving said axle.

4. The table saw securing device according to claim 3, wherein said axle includes a peripheral flange extended radially outward therefrom and engaged with said hub of said housing for rotatably securing said axle to said hub of said housing.

5. The table saw securing device according to claim 3, further comprising a spring biased projection engaged in said hub and engaged with said axle to position said axle to said hub at selected angular position.

* * * * *